(12) United States Patent
Hsieh et al.

(10) Patent No.: US 11,893,229 B2
(45) Date of Patent: Feb. 6, 2024

(54) PORTABLE ELECTRONIC DEVICE AND ONE-HAND TOUCH OPERATION METHOD THEREOF

(71) Applicant: ASUSTeK COMPUTER INC., Taipei (TW)

(72) Inventors: Meng Chen Hsieh, Taipei (TW); Chen-Yu Hsu, Taipei (TW); Chih-Hsien Yang, Taipei (TW); I-Hsi Wu, Taipei (TW); Hsin-Yi Pu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 17/751,685

(22) Filed: May 24, 2022

(65) Prior Publication Data

US 2022/0391061 A1 Dec. 8, 2022

(30) Foreign Application Priority Data

Jun. 7, 2021 (TW) .................................. 110120605

(51) Int. Cl.
*G06F 3/0488* (2022.01)
*G06F 3/0484* (2022.01)

(52) U.S. Cl.
CPC .......... *G06F 3/0488* (2013.01); *G06F 3/0484* (2013.01); *G06F 2203/04806* (2013.01)

(58) Field of Classification Search
CPC .......... G06F 3/048; G06F 2203/04806; G06F 3/0488–04886; G06F 3/0484–0486
See application file for complete search history.

(56) References Cited

U.S. PATENT DOCUMENTS

| 10,048,845 B2* | 8/2018 | Yamada | G06F 3/0488 |
| 10,860,191 B2* | 12/2020 | Han | G06F 3/04845 |
| 2013/0237288 A1* | 9/2013 | Lee | G06F 3/0482 |
| | | | 455/566 |
| 2014/0351761 A1* | 11/2014 | Bae | G06F 3/04817 |
| | | | 715/835 |

(Continued)

FOREIGN PATENT DOCUMENTS

| CN | 109960443 A | * | 7/2019 |
| CN | 110806833 | | 2/2020 |

(Continued)

OTHER PUBLICATIONS

Ingram, Samantha. The Thumb Zone: Designing for Mobile Users. Sep. 19, 2016. Smashing Magazine. p. 15-17 <https://www.smashingmagazine.com/2016/09/the-thumb-zone-designing-for-mobile-users/> (Year: 2016).*

*Primary Examiner* — Liang Y Li
(74) *Attorney, Agent, or Firm* — JCIPRNET (57) ABSTRACT

A portable electronic device and a one-hand touch operation method thereof are provided. A touch operation performed on a touch screen is detected. When a shift amount of the touch operation in a first direction is greater than a first threshold, whether to activate a one-hand mode is determined according to a shift amount of the touch operation in a second direction. When the one-hand mode is activated, the operation interface image is zoomed out or shifted, and displayed in a one-hand mode interface display region.

6 Claims, 9 Drawing Sheets

(56) References Cited

U.S. PATENT DOCUMENTS

| | | | |
|---|---|---|---|
| 2015/0033175 A1* | 1/2015 | Wu | G06F 3/0484 |
| | | | 715/771 |
| 2015/0205507 A1* | 7/2015 | Chen | G06F 3/04883 |
| | | | 715/800 |
| 2015/0234581 A1* | 8/2015 | Terrero | G06F 3/04847 |
| | | | 715/863 |
| 2016/0162150 A1* | 6/2016 | Patel | G06F 3/04842 |
| | | | 715/728 |
| 2017/0212631 A1* | 7/2017 | Kim | G06F 3/04883 |
| 2023/0015678 A1* | 1/2023 | Dai | G06F 3/0484 |

FOREIGN PATENT DOCUMENTS

| | | |
|---|---|---|
| CN | 111078114 | 4/2020 |
| TW | M486792 | 9/2014 |
| TW | 201621620 | 6/2016 |

\* cited by examiner

PORTABLE ELECTRONIC DEVICE AND ONE-HAND TOUCH OPERATION METHOD THEREOF

CROSS-REFERENCE TO RELATED APPLICATION

This application claims the priority benefit of Taiwan Application Serial No. 110120605, filed on Jun. 7, 2021. The entirety of the above-mentioned patent application is hereby incorporated by reference herein and made part of the specification.

BACKGROUND OF THE INVENTION

Field of the Invention

The disclosure relates to a portable electronic device and a one-hand touch operation method thereof.

Description of the Related Art

At present, portable electronic devices are gradually developing and tend to be equipped with large-size touch screens. However, the large-size touch screens prevent users from touching some regions of the touch screens when operating with one hand, which causes operational difficulty and inconvenience.

BRIEF SUMMARY OF THE INVENTION

According to the first aspect, a portable electronic device is provided. The portable electronic device includes a touch screen, a storage device, and a processor. The touch screen displays an operation interface image. The storage device records a plurality of instructions. The processor is coupled to the touch screen and the storage device, and is configured to execute the instructions to perform the following steps. A touch operation performed on a touch screen is detected. When a shift amount of the touch operation in a first direction is greater than a first threshold, whether to activate a one-hand mode is determined according to a shift amount of the touch operation in a second direction. When the one-hand mode is activated, the operation interface image is zoomed out or shifted, and displayed in a one-hand mode interface display region.

According to the second aspect, a one-hand touch operation method applied to a portable electronic device including a touch screen is provided. The method includes the following steps. A touch operation performed on a touch screen is detected. When a shift amount of the touch operation in a first direction is greater than a first threshold, whether to activate a one-hand mode is determined according to a shift amount of the touch operation in a second direction. When the one-hand mode is activated, the operation interface image is zoomed out or shifted, and displayed in a one-hand mode interface display region.

Based on the above, in an embodiment of the disclosure, under the condition that the shift amount of the touch operation in the first direction is greater than the first threshold, whether the touch operation conforms to a trigger gesture used to activate the one-hand mode is determined according to the shift amount of the touch operation in the second direction. Based on this, a user activates the one-hand mode more intuitively and conveniently. When the portable electronic device activates the one-hand mode, the portable electronic device zooms out or shifts, and displays the operation interface image in the one-hand mode interface display region, to facilitate the user to control the portable electronic device with one hand.

To make the features and advantages of the disclosure clear and easy to understand, the following gives a detailed description of embodiments with reference to accompanying drawings.

DETAILED DESCRIPTION OF THE EMBODIMENTS

Some embodiments of the disclosure are described in detail below with reference to the accompanying drawings. For reference numerals used in the following descriptions, same reference numerals in different accompanying drawings represent same or similar components. These embodiments are merely part of the disclosure, and do not disclose all possible implementations of the disclosure. More precisely, these embodiments are only examples of devices and methods in the scope of patent application of the disclosure.

Figure 1:
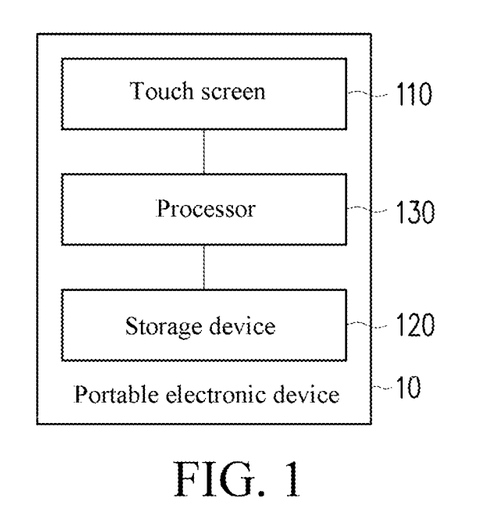
FIG. 1 is a functional block diagram of a portable electronic device according to an embodiment of the disclosure.

FIG. 1 is a functional block diagram of a portable electronic device according to an embodiment of the disclosure. Referring to FIG. 1, a portable electronic device 10 of this embodiment is, for example, an electronic device with a touch screen such as a smart phone, a personal digital assistant (PDA), a tablet computer, an e-book, or a game console. This is not limited in the disclosure. The portable electronic device 10 includes a touch screen 110, a storage device 120, and a processor 130. The processor 130 is coupled to the touch screen 110 and the storage device 120, and functions thereof are described below.

The touch screen 110 is a display device that integrates a touch sensing element, and provides both a display function and an input function. The display device is, in an embodiment, a liquid crystal display (LCD), a light-emitting diode (LED) display, a field emission display (FED), an organic light-emitting diode (OLED), or a display of another type, and the disclosure is not limited thereto. The touch sensing element is disposed on the display device, and the touch sensing element is configured to sense a touch operation performed on the display device. The touch operation includes touch of the touch screen 110 by a finger, a palm, a body part, or another object. In an embodiment, the touch sensing element is a capacitive touch sensor, a resistive touch sensor, a surface acoustic wave touch sensor, or an electromagnetic touch sensor, and the disclosure is not limited thereto.

The storage device 120 is configured to store files, images, instructions, codes, software elements, and other data, and may be, in an embodiment, any type of fixed or removable random access memory (RAM), read-only memory (ROM), flash memory, and hard disk or other similar apparatuses, integrated circuits, or a combination thereof.

The processor 130 is coupled to the touch screen 110 and the storage device 120, and is configured to control an actions of a member of the portable electronic device 10, which is, in an embodiment, a central processing unit (CPU), or other programmable general-purpose or special-purpose microprocessors, a digital signal processor (DSP), a programmable controller, an application specific integrated circuit (ASIC), a programmable logic device (PLD), a graphics processing unit (GPU), or other similar devices or a combination of the devices. The processor 130 executes a program code, a software module, an instruction, and the like recorded in the storage device 120, to implement the one-hand touch operation method in this embodiment of the disclosure.

In an embodiment, the touch screen 110 displays an operation interface image. The operation interface image includes an application program image, an application program menu image, a desktop image, and a control menu image, but the disclosure is not limited thereto. In an embodiment, the portable electronic device 10 provides a one-hand mode function to adjust a display region of the operation interface image on the touch screen 110, so that the user touches any position in the operation interface image as far as possible. In an embodiment, the portable electronic device 10 operated in the one-hand mode displays part of content of the shifted operation interface image through part of the display region of the touch screen 110. In an embodiment, the portable electronic device 10 operated in the one-hand mode displays content of the zoomed-out operation interface image by using part of the display region of the touch screen 110. In an embodiment, the user controls the portable electronic device 10 to activate the one-hand mode by issuing a touch operation that conforms to a trigger gesture. Embodiments are set forth below for clear illustration.

Figure 2:
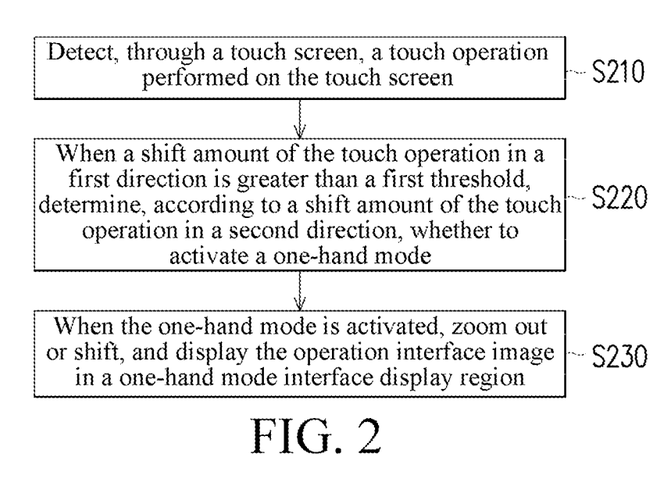
FIG. 2 is a flowchart of a one-hand touch operation method according to an embodiment of the disclosure.

FIG. 2 is a flowchart of a one-hand touch operation method according to an embodiment of the disclosure. Referring to FIG. 2, the method of this embodiment is applicable to the portable electronic device 10 in the foregoing embodiment. The detailed steps of performing the one-hand touch operation method by the portable electronic device 10 are described below in conjunction with various elements in the portable electronic device 10.

In step S210, the processor 130 detects, through the touch screen 110, a touch operation performed on the touch screen 110. In an embodiment, the touch operation is a sliding operation. In detail, when the touch screen 110 detects a plurality of touch points generated through touch by the user, the processor 130 obtains information of the touch points, to further recognize, according to the information of the touch points, the touch operation issued on the touch screen 110 by the user. In an embodiment, the processor 130 detects, according to information related to a touch operation, such as information of coordinates of a touch point that form a touch operation or information of a movement track of a touch operation, that the touch operation is a sliding operation, a click operation, or a touch operation of another type.

In step S220, when a shift amount of the touch operation in a first direction is greater than a first threshold, the processor 130 determines, according to a shift amount of the touch operation in a second direction, whether to activate a one-hand mode. In an embodiment, when a touch operation of which a start position is located on a screen edge of the touch screen 110 is detected, the processor 130 first determines whether the shift amount of the touch operation in the first direction is greater than the first threshold. When a shift amount of the touch operation in a first direction is greater than a first threshold, the processor 130 determines, according to a shift amount of the touch operation in a second direction, whether to activate a one-hand mode. In an embodiment, the first direction is perpendicular to the second direction. In an embodiment, the first direction is an X-axis direction of the touch screen 110, and the second direction is a Y-axis direction of the touch screen 110, where the X-axis direction and the Y-axis direction are respectively parallel to two screen boundaries of the touch screen 110.

In an embodiment, under the condition that the shift amount of the touch operation in the first direction is greater than the first threshold, the processor 130 compares the shift amount of the touch operation in the second direction with a second threshold. In an embodiment, when the shift amount of the touch operation in the second direction is greater than the second threshold, the processor 130 activates the one-hand mode. In other words, the sliding operation issued by the user needs to slide a sufficient distance in the first direction on the touch screen 110 and slide a sufficient distance in the second direction, and then the processor 130 determines that the touch operation confirms to the trigger gesture used to trigger the one-hand mode, and further initiates the one-hand mode.

In an embodiment, when the shift amount of the touch operation in the second direction is not greater than the second threshold, the processor 130 skips activating the one-hand mode and displays another operation interface image through the touch screen 110. That is, when the sliding operation issued by the user on the touch screen 110 first slides a sufficient distance in the first direction but does not slide a sufficient distance in the second direction, the processor 130 controls the touch screen 110 to switch to display another operation interface image. In an embodiment, when the shift amount of the touch operation in the second direction is not greater than the second threshold, the processor 130 controls the touch screen 110 to display a next page of application program menu or a previously browsed webpage. In other words, under the condition that the shift amount of the touch operation in the first direction is greater than the first threshold, the processor 130 determines, according to the shift amount of the touch operation in the second direction, whether to activate the one-hand mode or switch to display another operation interface image.

Figure 3:
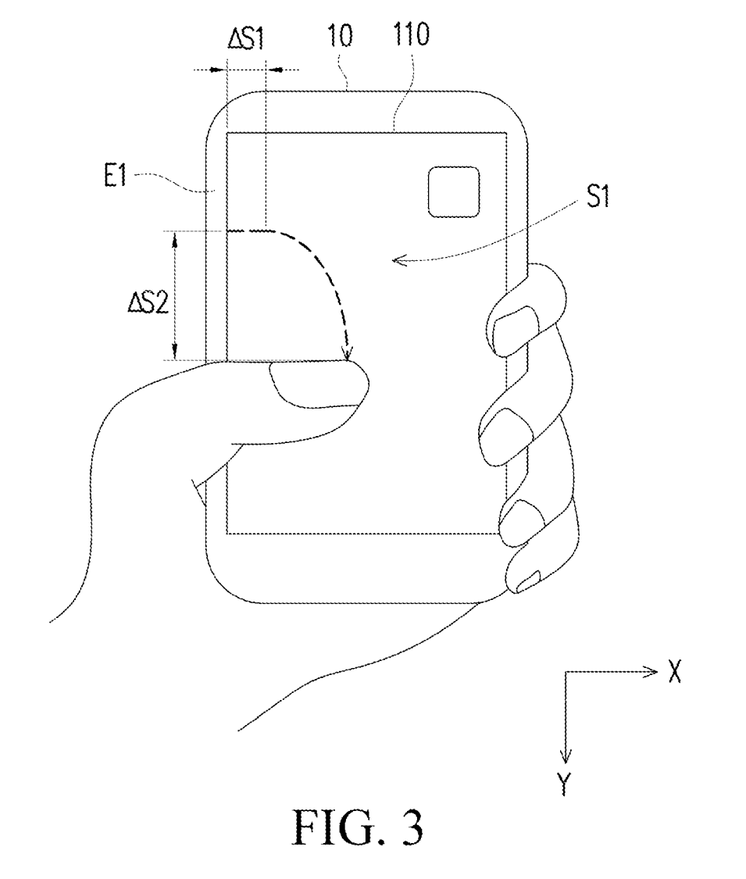
FIG. 3 is a schematic diagram of a situation in which a portable electronic device is held in one hand according to an embodiment of the disclosure.

FIG. 3 is a schematic diagram of a situation in which a portable electronic device is held in one hand according to an embodiment of the disclosure. Referring to FIG. 3 first, when the user holds the portable electronic device 10 in one hand, a thumb of the user is generally located on the touch screen 110, and the user mostly uses the thumb to control the portable electronic device 10. When the one-hand mode is not activated, the touch screen 110 displays an operation interface image S1 through an entire display region. Next, the thumb of the user slides, on the touch screen 110, horizontally from a screen edge E1 to a screen center of the touch screen 110. When a sliding shift amount ΔS1 of the thumb in the X-axis direction (that is, the first direction) is greater than the first threshold, the thumb of the user slides straight down. Next, when a sliding shift amount ΔS2 of the thumb in the Y-axis direction (that is, the second direction) is greater than the second threshold, the processor 130 determines that the touch operation conforms to the trigger gesture and activates the one-hand mode, to zoom out or shift, and display the operation interface image in the one-hand mode interface display region. It should be noted that an actual movement track of the touch operation conforming to the trigger gesture used to trigger the one-hand mode is not limited to the embodiment shown in FIG. 3.

In step S230, when the one-hand mode is activated, the processor 130 zooms out or shifts, and displays the operation interface image in a one-hand mode interface display region. When the processor 130 activates the one-hand mode, the processor 130 displays the operation interface image through the one-hand mode interface display region of the touch screen 110. The one-hand mode interface display region is part of the display region of the touch screen 110. In other words, when the one-hand mode is activated, the touch screen 110 includes the one-hand mode interface display region for displaying the operation interface image and another display region. In an embodiment, when the one-hand mode is activated, the processor 130 translates the operation interface image, and controls the touch screen 110 to display the translated operation interface image through the one-hand mode interface display region. In detail, the processor 130 translates the operation interface image by moving an image boundary of the operation interface image away from the screen edge, so that the translated operation interface image is displayed in the one-hand mode interface display region. In an embodiment, when the one-hand mode is activated, the processor 130 zooms out the operation interface image, and controls the touch screen 110 to display the zoomed-out operation interface image by using the one-hand mode interface display region. In this way, part of the display region of the touch screen 110 displays part or all of content of the operation interface image, and another display region of the touch screen 110 displays blank content.

Figure 4:
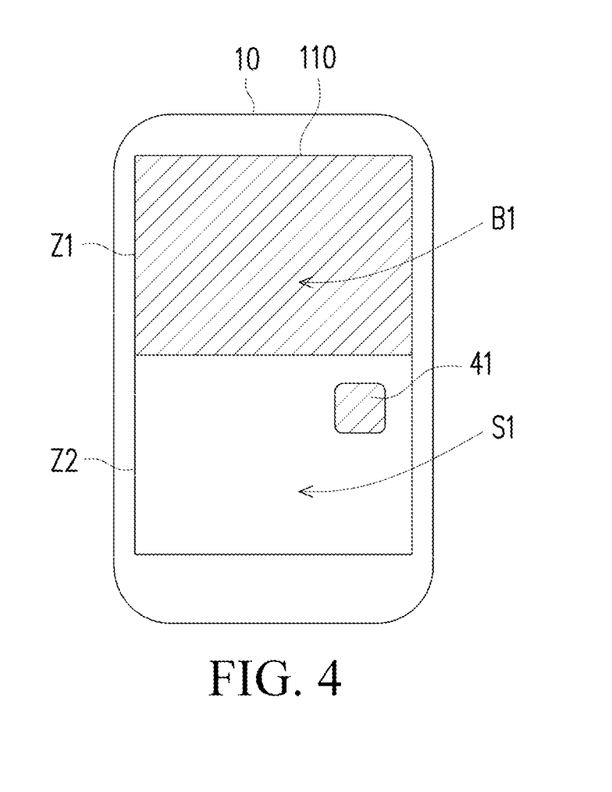
FIG. 4 is a schematic diagram of shifting and displaying an operation interface image in a one-hand mode interface display region in a one-hand mode according to an embodiment of the disclosure.

FIG. 4 is a schematic diagram of shifting and displaying an operation interface image in a one-hand mode interface display region in a one-hand mode according to an embodiment of the disclosure. Referring to FIG. 4, after the one-hand mode is activated, a display region Z1 located at an upper portion of the touch screen 110 displays blank content B1, and a one-hand mode interface display region Z2 located at a lower portion of the touch screen 110 displays an upper half part of the operation interface image S1, so that the user, while holding the portable electronic device 10 in one hand, is able to reach an icon 41 of an application program located at an upper portion of the operation interface image S1. In an embodiment, after the one-hand mode is activated, when the user touches any position of the display region Z1, the processor 130 deactivates the one-hand mode. Alternatively, after the one-hand mode is activated, the processor 130 deactivates the one-hand mode when the user touches the one-hand mode interface display region Z2 to switch a display page or leave a current display page. In an embodiment, when the user clicks on the icon 41 of the application program, the processor 130 deactivates the one-hand mode and controls the touch screen 110 to display an application program interface of the application program.

Figure 5:
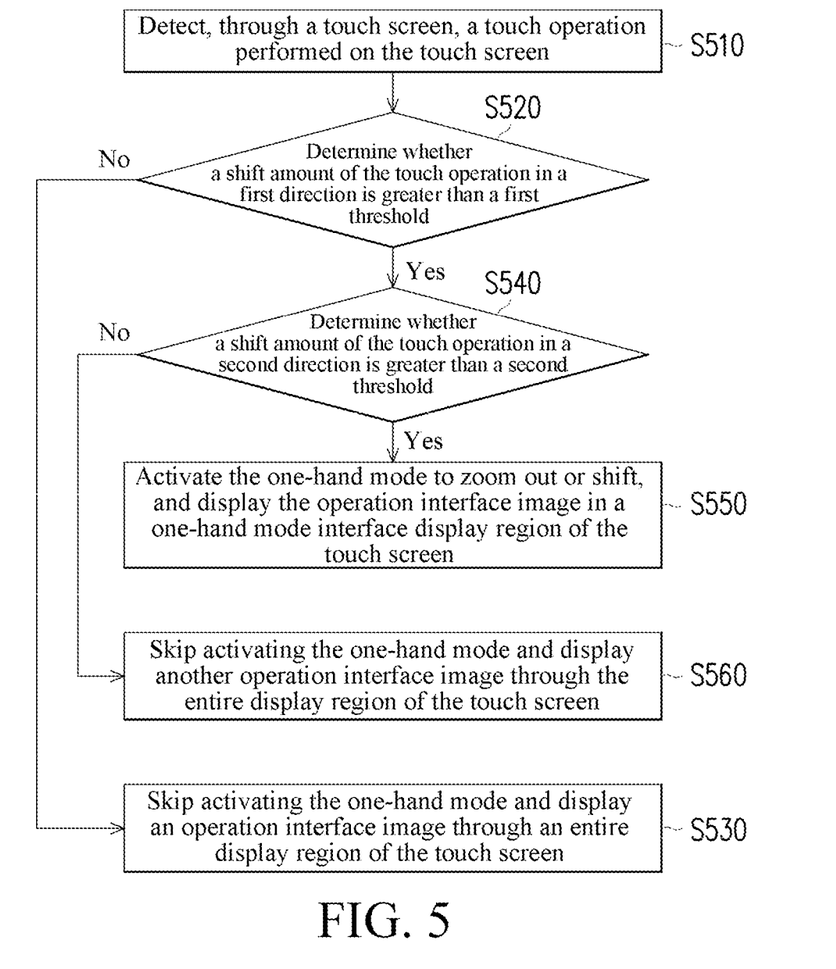
FIG. 5 is a flowchart of a one-hand touch operation method according to an embodiment of the disclosure.

FIG. 5 is a flowchart of a one-hand touch operation method according to an embodiment of the disclosure. Referring to FIG. 5, the method of this embodiment is applicable to the portable electronic device 10 in the foregoing embodiment. The detailed steps of performing the one-hand touch operation method by the portable electronic device 10 are described below in conjunction with various elements in the portable electronic device 10.

In step S510, the processor 130 detects, through the touch screen 110, a touch operation performed on the touch screen 110. In step S520, the processor 130 determines whether a shift amount of the touch operation in a first direction is greater than a first threshold. If it is determined in step S520 that the shift amount is not greater than the first threshold, in step S530, the processor 130 skips activating the one-hand mode and displays an operation interface image through an entire display region of the touch screen 110. That is, the processor 130 does not change the display image in response to the touch operation on the touch screen 110. If it is determined in step S520 that the shift amount is greater than the first threshold, in step S540, the processor 130 determines whether a shift amount of the touch operation in a second direction is greater than a second threshold. If it is determined in step S540 that the shift amount is greater than the second threshold, in step S550, the processor 130 activates the one-hand mode to zoom out or shift, and display the operation interface image in a one-hand mode interface display region of the touch screen 110. If it is determined in step S540 that the shift amount is not greater than the second threshold, in step S560, the processor 130 skips activating the one-hand mode and displays another operation interface image through the entire display region of the touch screen 110. That is, when the shift amount of the touch operation in the first direction is greater than the first threshold but the shift amount of the touch operation in the second direction is not greater than the second threshold, the processor 130 controls the touch screen 110 is switched to display another operation interface image, instead of the current operation interface image. In this way, the another operation interface image is a next page of application program menu or a previously browsed webpage and the like.

It should be particularly noted that, in an embodiment, the processor 130 provides a visual prompt through the touch screen 110 during the touch operation performed by the user, so that the user learns about whether the touch operation is capable of triggering the portable electronic device 10 to activate the one-hand mode. The foregoing visual prompt includes displaying a prompt icon, changing a color of the prompt icon, changing a shape of the prompt icon, changing a direction of the prompt icon, or the like. Alternatively, the visual prompt includes changing a display position of the operation interface image on the touch screen 110, or the like.

In an embodiment, when the shift amount of the touch operation in the second direction increases to a preset value, the processor 130 provides a first visual prompt through the touch screen 110, the preset value being less than the second threshold. In an embodiment, the first visual prompt includes separating an image boundary of the operation interface image from a screen edge of the touch screen 110. In other words, when the shift amount of the touch operation in the second direction increases to be equal to the preset value but less than the second threshold, the touch screen 110 prompts the user through the first visual prompt, so that the user learns about that the touch operation issued by the user possibly activates the one-hand mode. Next, in a period in which the shift amount of the touch operation in the second direction increases from the preset value to be greater than the second threshold, the processor 130 provides a second visual prompt different from the first visual prompt through the touch screen 110. In an embodiment, the second visual prompt includes moving the image boundary of the operation interface image toward the second direction, and turning an indication direction of a prompt icon to the second direction. In other words, in the period in which the shift amount of the touch operation in the second direction increases from the preset value to be greater than the second threshold, the touch screen 110 prompts the user through the second visual prompt, so that the user learns about how to continue to perform the touch operation that confirms to the trigger gesture.

Figure 6A:
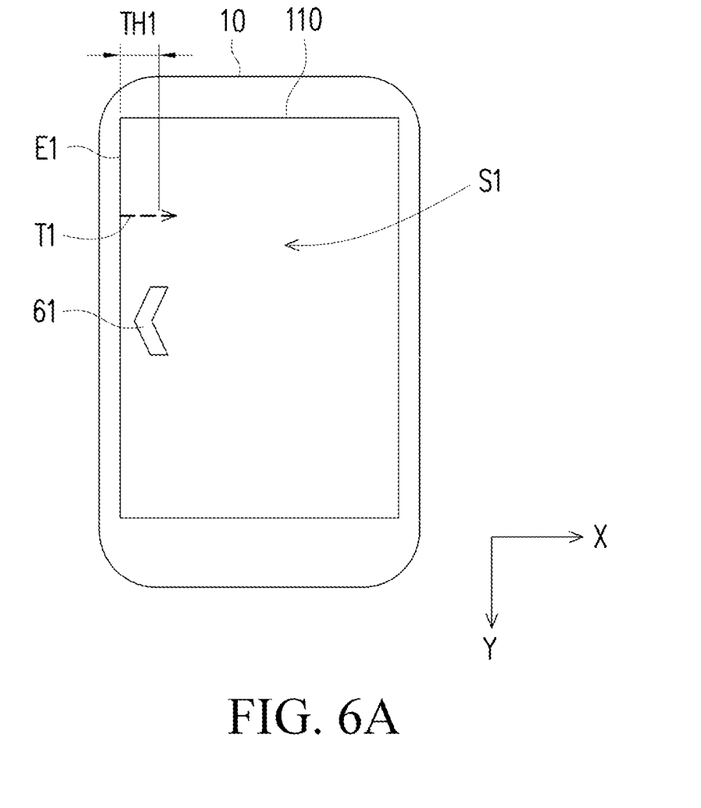
FIG. 6A to FIG. 6E are schematic diagrams of activating a one-hand mode according to an embodiment of the disclosure.

In an embodiment, FIG. 6A to FIG. 6E are schematic diagrams of activating a one-hand mode according to an embodiment of the disclosure. Referring to FIG. 6A, when the one-hand mode is not activated, the touch screen 110 displays an operation interface image S1 through an entire display region. In a period in which a shift amount of a touch operation T1 in a first direction is greater than a first threshold, the touch screen 110 displays an arrow icon 61 pointing to a screen edge E1.

Figure 6B:
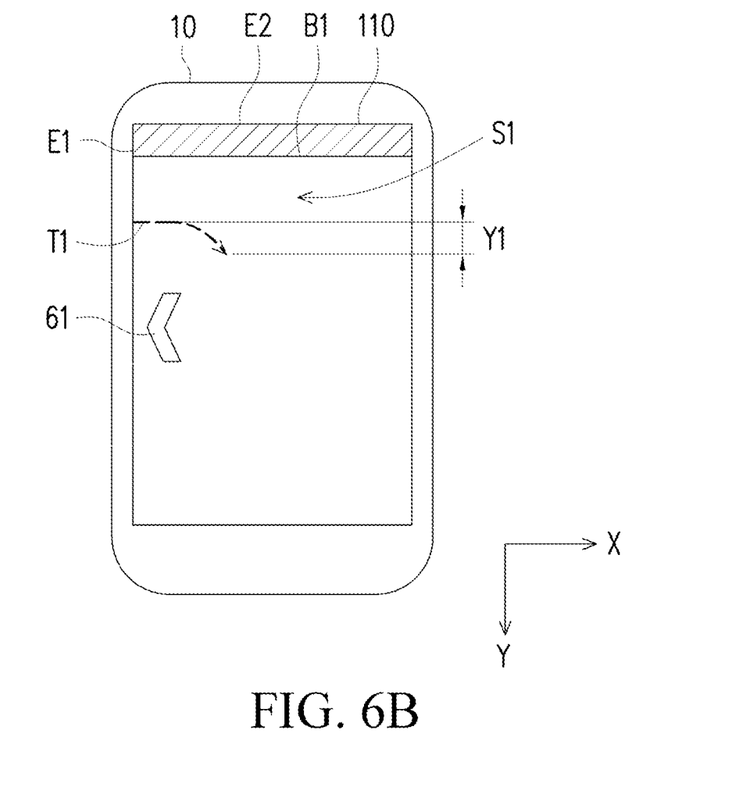

Referring to FIG. 6B, when a shift amount of the touch operation T1 in a second direction increases to a preset value Y1, the processor 130 controls the touch screen 110 to provide a first visual prompt, so that an image boundary B1 of the operation interface image S1 is separated from a screen edge E2 of the touch screen 110. In other words, when the first visual prompt is provided, the image boundary B1 of the operation interface image S1 is separated from the screen edge E2 of the touch screen 110 by a distance.

Figure 6C:
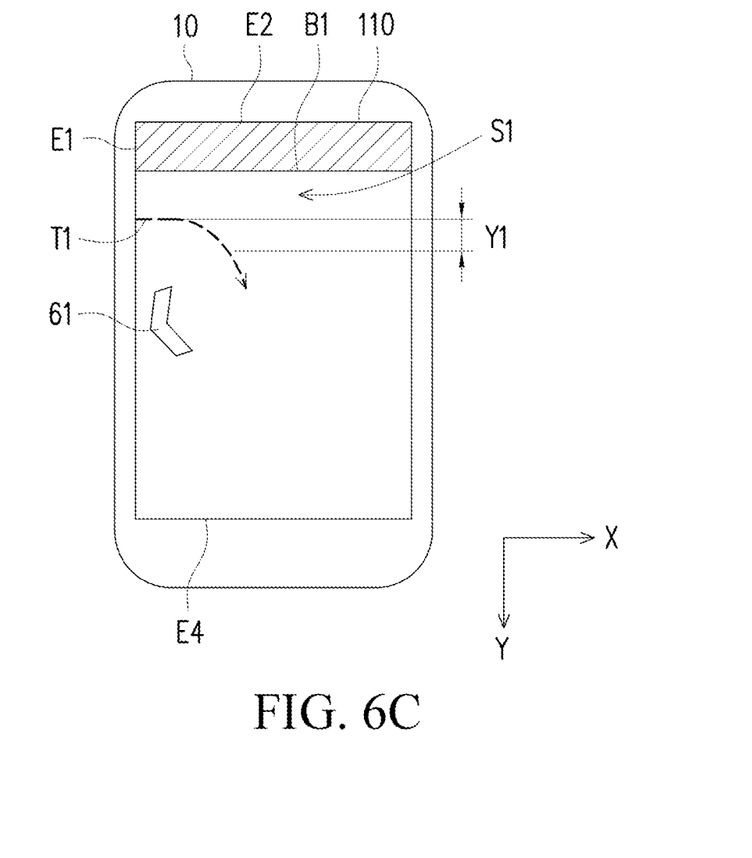
Figure 6D:
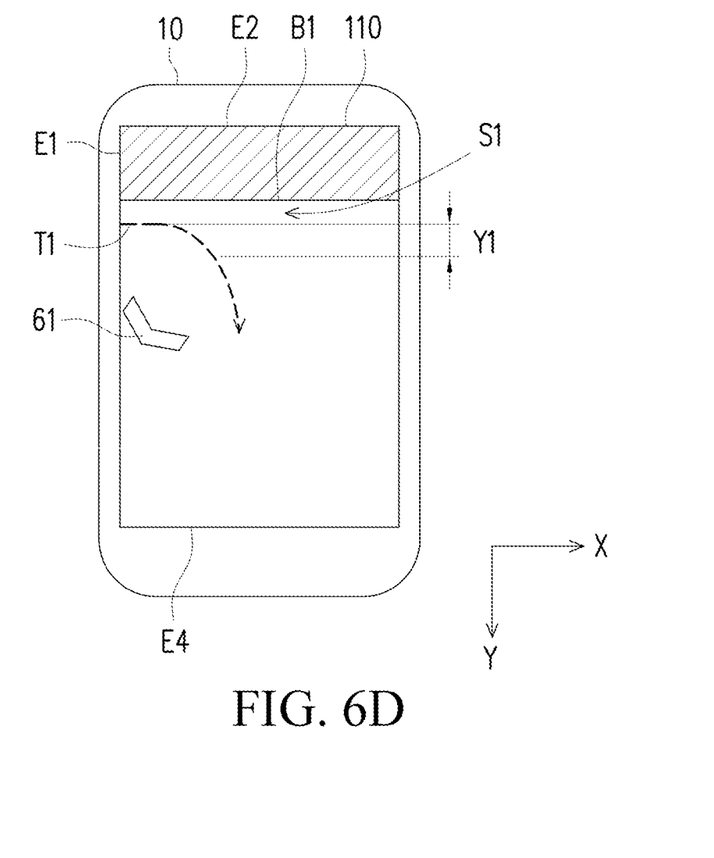

Referring to FIG. 6C and FIG. 6D, in a period in which the shift amount of the touch operation T1 in the second direction increases from the preset value to be greater than the second threshold, the processor 130 controls the touch screen 110 to provide a second visual prompt. Specifically, in the period in which the shift amount of the touch operation T1 in the second direction increases from the preset value to be greater than the second threshold, the image boundary B1 of the operation interface image S1 gradually moves downward as sliding of the touch operation T1, and a direction of the arrow icon 61 rotates counter-clockwise and gradually points to a screen edge E4.

Figure 6E:
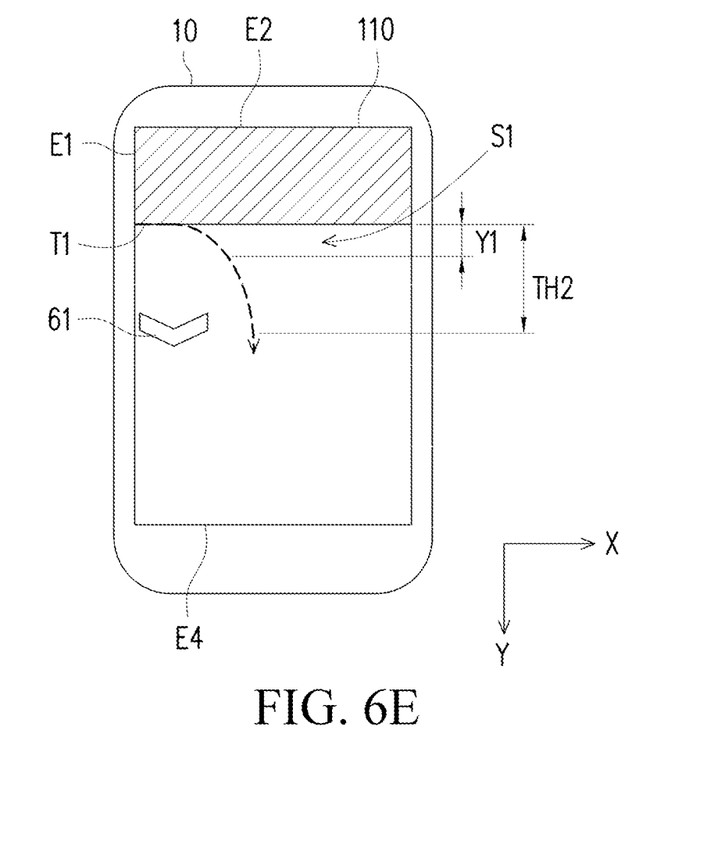

Referring to FIG. 6E, when the shift amount of the touch operation T1 in the second direction increases to be greater than a second threshold TH2, the processor 130 controls the touch screen 110 to display the operation interface image in a one-hand mode interface display region and display the arrow icon 61 pointing to the screen edge E4.

Based on the above, in this embodiment of the disclosure, the user controls the portable electronic device to activate the one-hand mode through the simple and intuitive touch operation. When the portable electronic device activates the one-hand mode, the portable electronic device displays the operation interface image in the one-hand mode interface display region near a finger of the user, to facilitate the user to control the portable electronic device with one hand. In addition, the portable electronic device provides the corresponding visual prompt when the user performs the touch operation, thereby significantly improving the user experience in activating the one-hand mode.

Although the disclosure has been described with reference to the above embodiments, the embodiments are not intended to limit the disclosure. A person of ordinary skill in the art may make variations and improvements without departing from the spirit and scope of the disclosure. Therefore, the protection scope of the disclosure should be subject to the appended claims.

What is claimed is:

1. A portable electronic device, comprising:
    a touch screen, displaying an operation interface image;
    a storage device, recording a plurality of instructions; and
    a processor, coupled to the touch screen and the storage device, and configured to execute the instructions to:
    detect a touch operation performed on the touch screen, wherein the touch operation includes an operation comprising movement in a first direction followed by movement in a second direction in a sequence, wherein the second direction is a vertical direction alongside a screen edge of the touch screen and the first direction is a horizontal direction inward from the screen edge of the touch screen to a center of the touch screen;
    determine whether a shift amount of the touch operation in the first direction is greater than a first non-zero threshold;
    in response to determining the shift amount of the touch operation is greater than the first threshold:
    activate a one-hand mode in response to determining a shift amount of the touch operation in the second direction is greater than a second non-zero threshold, and skip activating the one-hand mode and display another operation interface image in response to determining the shift amount of the touch operation in the second direction is not greater than the second threshold;
    provide a first visual prompt when the shift amount of the touch operation in the second direction increases to a preset value, the preset value being less than the second threshold, wherein the first visual prompt comprises separating an image boundary of the operation interface image from a screen edge of the touch screen; and
    zoom out or shift the operation interface image and display the operation interface image in a one-hand mode interface display region in response to the one-hand mode being activated.

2. The portable electronic device according to claim 1, wherein the processor is configured to: provide a second visual prompt in a period in which the shift amount of the touch operation in the second direction increases from the preset value to be greater than the second threshold.

3. The portable electronic device according to claim 2, wherein the second visual prompt comprises moving the image boundary of the operation interface image toward the second direction, and turning an indication direction of an arrow icon to the second direction.

4. A one-hand touch operation method, applied to a portable electronic device comprising a touch screen, the method comprising:
    detecting a touch operation performed on the touchscreen, wherein the touch operation includes an operation comprising movement in a first direction followed by movement in a second direction in a sequence, wherein the second direction is a vertical direction alongside a screen edge of the touch screen and the first direction is a horizontal direction inward from the screen edge of the touch screen to a center of the touch screen;
    determining whether a shift amount of the touch operation in the first direction is greater than a first non-zero threshold;
    in response to determining the shift amount of the touch operation is greater than the first threshold:
    activating a one-hand mode in response to determining a shift amount of the touch operation in the second direction is greater than a second non-zero threshold, and skip activating the one-hand mode and display another operation interface image in response to determining the shift amount of the touch operation in the second direction is not greater than the second threshold;

wherein the shift amount of the touch operation in the second direction comprises a difference between a coordinate component of a touch start position of the touch operation in the second direction and a coordinate component of a touch end position of the touch operation in the second direction;

providing a first visual prompt when the shift amount of the touch operation in the second direction increases to a preset value, the preset value being less than the second threshold, wherein the first visual prompt comprises separating an image boundary of the operation interface image from a second edge of the touch screen; and zooming out or shifting the operation interface image and displaying the operation interface image in a one-hand mode interface display region in response to the one-hand mode being activated.

5. The one-hand touch operation method according to claim 4, further comprising: providing a second visual prompt in a period in which the shift amount of the touch operation in the second direction increases from the preset value to be greater than the second threshold.

6. The one-hand touch operation method according to claim 5, wherein the second visual prompt comprises moving the image boundary of the operation interface image toward the second direction, and turning an indication direction of an arrow icon to the second direction.

* * * * *